(12) United States Patent
Okayama

(10) Patent No.: US 6,456,764 B1
(45) Date of Patent: Sep. 24, 2002

(54) OPTICAL DIRECTIONAL COUPLER

(75) Inventor: Hideaki Okayama, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 25 days.

(21) Appl. No.: 09/668,372

(22) Filed: Sep. 25, 2000

(30) Foreign Application Priority Data

Sep. 22, 1999 (JP) .............................................. 11-269202

(51) Int. Cl.[7] .............................. G02B 6/26; G02B 6/42
(52) U.S. Cl. .............................. 385/42; 385/39; 385/14; 385/50; 385/129; 385/32
(58) Field of Search ............................. 385/41, 42, 14, 385/46, 50, 27, 39, 129–132, 32

(56) References Cited

U.S. PATENT DOCUMENTS 6,233,375 B1 * 5/2001 Lang et al. ..................... 385/14

OTHER PUBLICATIONS

An Introduction to Photonic Switching Fabrics, S. Hinton, Plenum, 1993, pp. 47–55.

* cited by examiner

Primary Examiner—Hemang Sanghavi
Assistant Examiner—Scott Knauss
(74) Attorney, Agent, or Firm—Venable; Robert J. Frank; Michael A. Sartori

(57) ABSTRACT

An optical directional coupler includes a first waveguide, a second waveguide and a plurality of bridge waveguides connecting the first waveguide and the second waveguide.

7 Claims, 6 Drawing Sheets

OPTICAL DIRECTIONAL COUPLER

BACKGROUND OF THE INVENTION

1. Field of the Invention

The present invention relates to an optical directional coupler.

2. Description of the Related Art

There has conventionally been provided an optical directional coupler in the field of optical communication. An optical directional coupler refers to a power distributor that employs optical coupling of optical signals propagating in two adjacent waveguides.

An example of a configuration of this optical directional coupler is disclosed in the literature (An Introduction to Photonic Switching Fabrics, S. Hinton, Plenum, 1993, pp. 47–55).

The following will describe the configuration of a first prior-art optical directional coupler 100 with reference to FIG. 7. FIG. 7 is a plan view of the first directional coupler 100 as viewed from the upper side of the main surface of a clad layer. Because a waveguide (i.e., core) 102 is covered by a clad layer 104 and a substrate (not shown in FIG. 7), the waveguide 102 cannot directly be seen from the upper side of the main surface 104A of the clad layer 104. In order to spotlight the shape of the waveguide 102, FIG. 7 shows the shape of the waveguide 102 (hatched portion) on this main surface 104A. The waveguide 102 comprises two waveguides, namely a first waveguide 106 and a second waveguide 108. The first waveguide 106 and the second waveguide 108 are disposed symetrically with respect to the centerline CL between the first waveguide 106 and the second waveguide 108, and include an optical signal input region R1O1, an optical signal coupling region R103 and an optical signal output region R105. In the optical signal coupling region R103, the first waveguide 106 and the second waveguide 108 are formed adjacently and are straight and parallel so that an optical field distribution of optical signals that propagate along the waveguides 106 and 108 couples substantially. In the optical signal input region R101 and the optical signal output region R105, the first waveguide 106 and the second waveguide 108 are formed with a certain angle cc to the centerline CL so that the optical field distribution of the optical signals does not couple. In short, the optical signal input region R101 and the optical signal output region RI05 are not coupling regions.

Next, the propagation form of an optical signal in the first directional coupler 100 is described below. This example is explained with reference to a case where an optical signal is input from outside to the first waveguide 106 of the optical signal input region R101. This optical signal propagates through the first waveguide 106 in the optical signal input region R101 and then enters the optical signal coupling region R103. In the optical signal coupling region R103, alternating power transfers between the first waveguide 106 and the second waveguide 108, the power of the optical signal propagating toward the optical signal output region R105. Then, the optical signal arrives at the optical signal output region R105. At this arrival, if the power of the optical signal is concentrated in the first waveguide 106, the optical signal propagates along the first waveguide 106 in the output region R105. If the power of the optical signal is concentrated in the second waveguide 108, the optical signal propagates along the second waveguide 108 in the output region R105. If the power of the optical signal is divided equally between the first waveguide 106 and the second waveguide 108, the divided optical signals propagate along the first waveguide 106 and the second waveguide 108, respectively.

An optical device, such as an optical switch or an directional coupler is made by employing the first optical directional coupler 100.

On the other hand, as a modification of the first optical directional coupler 100, there is provided a second prior-art optical directional coupler. FIG. 8 is a plan view as viewed from the upper side of the main surface of a clad layer of a second prior-art directional coupler 200. In the second directional coupler 200, a first waveguide 202 and a second waveguide 204 are disposed symmetrically with respect to the centerline between the first waveguide 202 and the second waveguide 204, and are curved smoothly (or to be differentiated). For example, when the second directional coupler 200 is used as an optical switch, an operation range (a permissible range of an applied voltage) in a bar state is wider than the operation range of the first directional coupler 100, thus, there is an advantage to perform the bar state easily.

However, for example, when the above-mentioned prior-art optical directional coupler is used in cascade-connection, the waveguide in the non-coupling region of optical signals or an adjacent region including the connection part is not needed to perform the function. The waveguide in the non-coupling region is used only for propagating optical signals, but does not contribute substantially to the coupling of optical signals. For existence of the waveguide in the non-coupling region, the whole length of the directional coupler in a cascade-connection, i.e. length along propagation direction of optical signals, cannot be shortened. Therefore, problematically, the optical device cannot be minimized.

Furthermore, for example, when a compound semiconductor is used as a material for a core (i.e. waveguide), the refractive index of the compound semiconductor is higher than a refractive index of a simple semiconductor. To generate optical coupling between two waveguides in an optical signal coupling region, the distance between the waveguides needs to be reduced. However, fine adjustment of the distance is difficult, which makes fine adjustment of the coupling coefficient (represented herein by symbol K) of the two waveguides also difficult. As a result, required coupling of the optical signals that propagate the two waveguides does not occur. Therefore, for example, when this directional coupler is used as an optical switch, crosstalk increases problematically. To guard against this, there has been need for an optical directional coupler that has a shorter whole length, and can be designed easily.

SUMMARY OF THE INVENTION

It is therefore an object of the invention to provide an optical directional coupler which solves the above described problem. According to the invention, the optical directional coupler includes a first waveguide, a second waveguide and a plurality of bridge waveguides connecting the first waveguide and the second waveguide.

DESCRIPTION OF THE PREFERRED EMBODIMENTS

Figure 1:
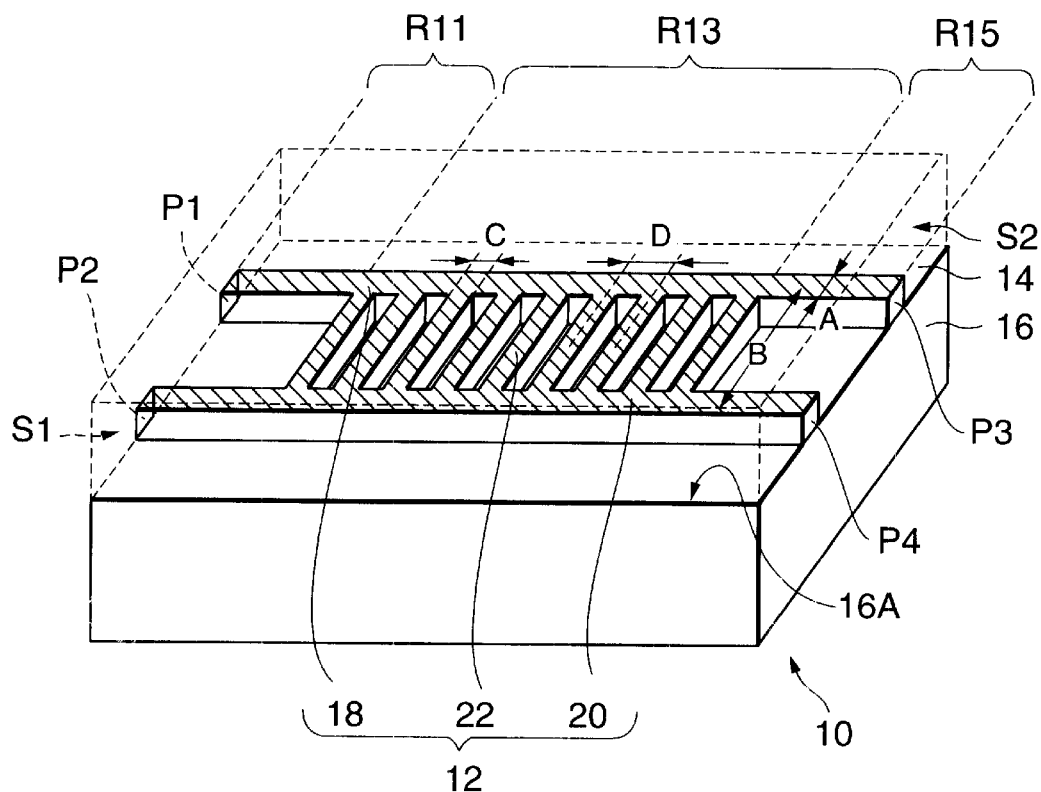
FIG. 1 is a perspective view of an embodiment of an optical directional coupler of the present invention.

The following will describe embodiments of the present invention with reference to the drawings. In the drawings, the size, the shape, and the mutual relationship in arrangement of each component are just roughly shown for the understanding of the present invention, so that the present invention is not limited to the exemplified embodiments.

Figure 2:
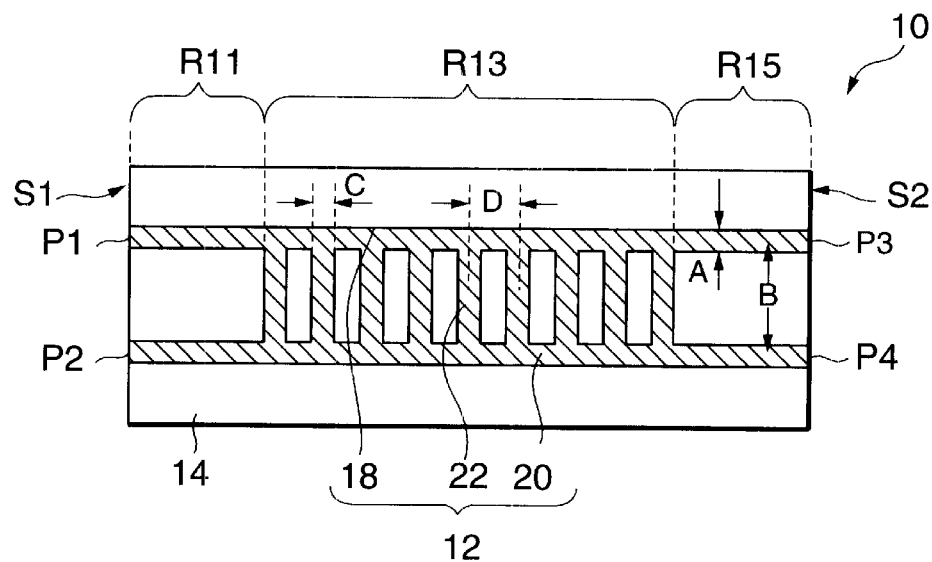
FIG. 2 is a plan view of the embodiment of the present invention.

First, with reference to FIGS. 1 and 2, an overall configuration of an optical directional coupler 10 is described which is an example of the present invention.

FIG. 1 is a perspective view indicating the configuration of the optical directional coupler. FIG. 2 is a plan view of the optical directional coupler as viewed from the upper side of the main surface of the clad layer of the optical directional coupler.

This optical directional coupler 10 comprises a waveguide (i.e., core layer) 12 for propagation of an optical signal, a clad layer 14 for confining this optical signal into the waveguide 12, and a substrate 16. The clad layer 14 and the substrate 16 form an outline (rectangular in this embodiment) of the directional coupler 10. Since the waveguide 12 is formed on the substrate 16, and is covered with the clad layer 14, the waveguide 12 cannot be seen from outside. In FIG. 1, to spotlight the solid shape of the waveguide 12, its region is expressed in a solid line. Boundary lines of the clad layer 14 are expressed in a dotted line. In FIG. 2, to spotlight the plane shape of the waveguide 12, its region is expressed with hatched lines and is projected on a main surface of the clad layer 14.

The waveguide 12 comprises a first waveguide 18 and a second waveguide 20, and a plurality of bridge waveguides that connect the first waveguide 18 and the second waveguide 20, respectively. In this embodiment, the first waveguide 18 and the second waveguide 20 are straight and parallel. The first waveguide 18 and the second waveguide 20 are disposed to be parallel along the major axis of the optical directional coupler 10. The bridge waveguides 22 are disposed to cross at right angles with the first waveguide 18 and the second waveguide 20 (i.e., along the minor axis of the directional coupler 10), and are disposed almost at the center of the directional coupler 10. In this embodiment, the bridge waveguides 22 are arranged with equal distance. By forming the bridge waveguides 22 as such, the region where the bridge waveguides 22 are disposed becomes an optical signal coupling region R13. Namely, the optical signal coupling region R13 is a region in which an optical field distribution of optical signals that propagate in each of first waveguide 18 and second waveguide 20 couple. The wider the distance between the adjacent bridge waveguides 22, the larger the coupling coefficient of the first waveguide 18 and second waveguide 20. The coupling region R13 lies between an optical signal input region R11 and an optical signal output region R15. The bridge waveguides 22 are not disposed in the input region R11 or the output region R15.

Furthermore, this optical directional coupler 10 comprises input ports P1 and P2 for inputting an optical signal, and output ports P3 and P4 for outputting the optical signal. The input ports P1 and P2 are connected to the ends of the first waveguide 18 and the second waveguide 20, respectively, and are in a region of the same first end surface S1 in the optical directional coupler 10. The output ports P3 and P4 are connected to the other ends of the first waveguide 18 and the second waveguide 20, respectively, and are in a region of the second end surface S2 opposite to the first end surface S1.

Next, the process is described for manufacturing this optical directional coupler 10.

In this configuration example, as the above-mentioned substrate 16, a rectangular substrate is used which has an electro-optic effect. This substrate 16 is made of, for example, an organic material, a ferroelectric, glass, InP, $LiNbO_3$, etc. On the main surface 16A of this substrate 16 is formed a core layer (e.g., non-doped InGaAsP, organic material, ferroelectric, glass, or $LiNbO_3$ with higher index) by the chemical vapor deposition (CVD) method or the epitaxial growth method. Next, the photolithography method, for example, is used to form a resist pattern having the same pattern as the waveguide 12, on the main surface of the core layer, and the pattern is then used to process the core layer. With this, a core for the waveguide 12 is formed. Next, on the core (waveguide 12) and the main surface 16A is formed a film of the clad layer 14 (made of the same material as that of the substrate 16) to a same height as measured from the level of the main surface 16A, using the CVD method or the epitaxial growth method, thus completing the optical directional coupler 10.

Next, the propagation of an optical signal with the optical directional coupler 10 is described.

In this example, an optical signal having a predetermined single wavelength is input from the input port P1 to the first waveguide 18. This optical signal propagates through the first waveguide 18 in the optical signal input region R11 and then enters the optical signal coupling region R13. In the optical signal coupling region R13, alternating power transfer between the first waveguide 18 and the second waveguide 20, power of the optical signal propagates toward the optical signal output region R15. Then, the optical signal arrives at the optical signal output region R15. At this arrival, if the power of the optical signal is concentrated in the first waveguide 18, the optical signal propagates along the first waveguide 18 in the output region R15. If the power of the optical signal is concentrated in the second waveguide 20, the optical signal propagates along the second waveguide 20 in the output region R15. If the power of the optical signal is divided equally between the first waveguide 18 and the second waveguide 20, the divided optical signals propagate along the first waveguide 18 and the second waveguide 20, respectively.

Figure 3:
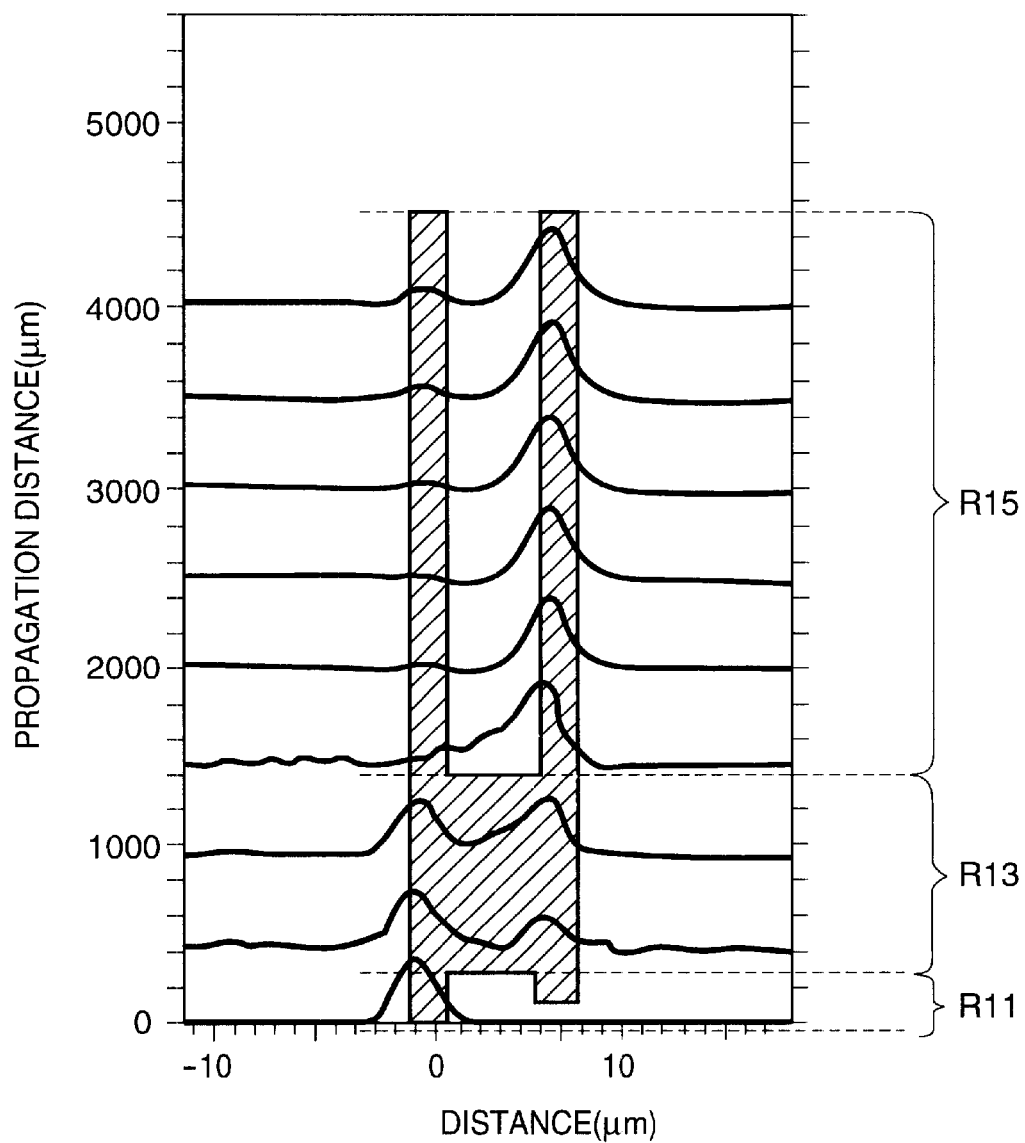
FIG. 3 is a graph indicating results of simulation of the propagation of an optical signal according to the embodiment of the present invention.
Figure 4:
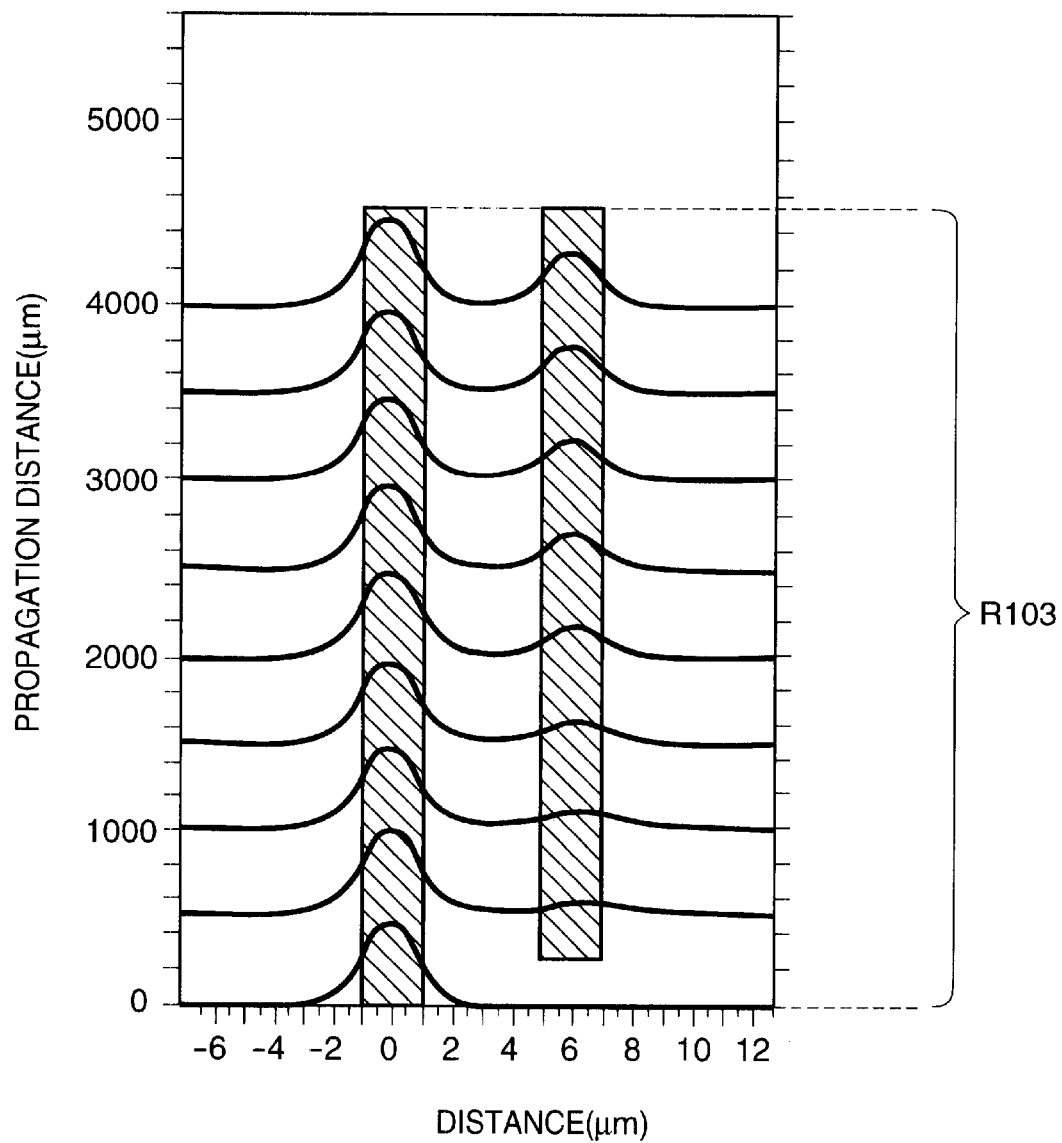
FIG. 4 is a graph indicating results of simulation of the propagation of an optical signal with a first prior-art optical coupler.

Next, the results are described of simulating the propagation form of an optical signal with the optical directional coupler, with reference to FIGS. 3 and 4. FIG. 3 is a graph indicating the simulation results for the propagation form of the optical signal with the optical directional coupler according to the present invention. FIGS. 4 is a graph indicating the simulation results of the propagation form of an optical signal with the first prior-art optical directional coupler. Their vertical and horizontal axes represent a distance of a light in its propagation direction (i.e., propagation distance measured in the unit of μm) and a perpendicular distance measured also in the unit of μm. The 0-μm mark on the horizontal axis indicates the centerline of the first waveguide. Furthermore, the figures show a regional portion (hatched portion) of waveguides. (In FIG. 3, each of the bridge waveguide 22 is not shown, but their area is expressed with hatched portion.) In this example, in either case, the simulation was conducted using the conventionally known beam propagation method (BPM). Moreover, the optical signal input from an input port to the optical coupler is a Gaussian beam having a wavelength of 1.55 μm. In addition, the widths A of both the first waveguide and the second waveguide are each 2 μm. The distance B between the centers of the first waveguide and the second waveguide is 4 μm. For the optical directional coupler 10, the widths C of the bridge waveguides are 5 μm, and the distance D between the centers of the bridge waveguides is 10 μm. The clad layer and the substrate each have a refractive index of 3.40 respectively. The core (waveguide) has a uniform refractive index value of 3.42.

Comparing FIG. 3 (the optical directional coupler 10 of the present invention) and FIG. 4 (the first prior-art optical directional coupler 100) shows that, in the directional coupler 10, the power of the optical signals shifts to the second waveguide 20 near the output port. On the other hand, in the directional coupler 100, a major portion of the power of the optical signals exists at the side of the first waveguide 106. Specifically, under the same condition of the refractive index and the widths of the waveguides, the complete coupling length (required length for the shift of the optical power from one side to the other side) of the directional coupler 10 is about 550 μm. In contrast, the complete coupling length of the directional coupler 100 is about 1 cm. That is, the complete coupling length of the directional coupler 10 is shorter than that of the directional coupler 100. Therefore, in contrast to the directional coupler 100, the optical directional coupler 10 can be minimized.

Figure 5:
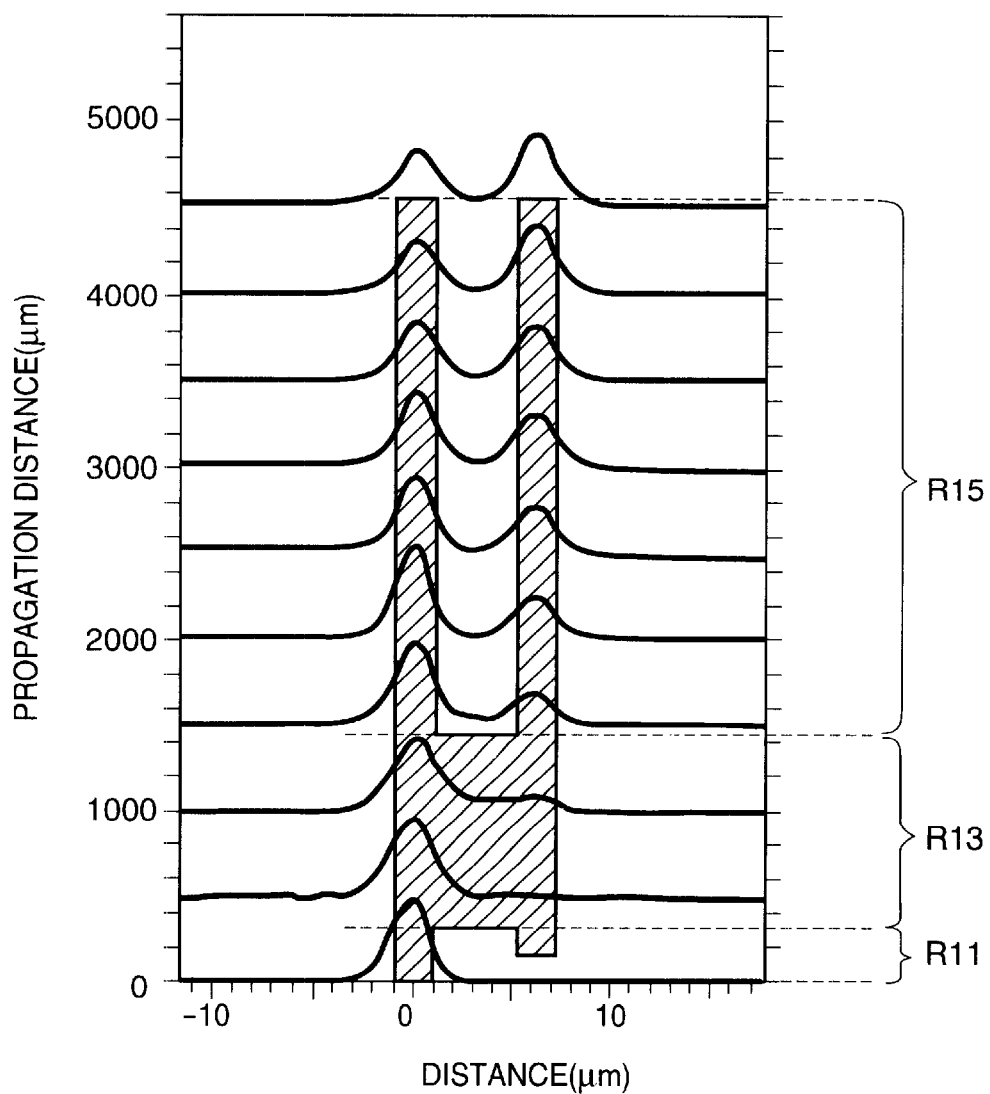
FIG. 5 is a graph indicating results of simulation of the propagation of an optical signal according to the embodiment of the present invention.

FIG. 5 is a graph indicating the simulation results for the propagation form of the optical signal with the optical directional coupler according to the present invention. In this simulation, the widths C of the bridge waveguide 22 are still 5 μm, but the distance D between centers of the adjacent bridge waveguides is 20 μm (two times as long as the distance D of FIG. 3). In this example, the power of the optical signal is divided equally near the output ports P3 and P4. That is, the complete coupling length of the directional coupler 10 in FIG. 5 is two times as long as that in FIG. 3. In general, for optical directional couplers, the following equation is formed.

$$Lc = \pi/2K \quad (1)$$

In the above equation (1), Lc represents complete coupling length, and K represents a coupling coefficient between the first waveguide 18 and the second waveguide 20. Accordingly, employing the equation (1), the coupling coefficient in FIG. 5 is half as much as that in FIG. 3. Therefore, according to the configuration of the optical directional coupler 10, by adjusting the distance D between the adjacent bridge waveguide 22, a desired coupling coefficient is provided. As a result, desired optical-field distribution is provided.

In the directional coupler 10, it is necessary that the distance D between the adjacent bridge waveguide 22 is not more than ten times as much as the width C of the bridge waveguide 22. If so, loss of the optical signal increases in the bridge waveguide 22.

When a core (i.e., waveguide) is made of, for example, compound semiconductor as described above, the conventional configuration needs a shorter distance B between the first wavegnide 18 and the second waveguide 20, but the configuration according to the present invention does not need a shorter distance B, because, by employing the bridge waveguide 22, any coupling coefficient can be set up in advance. Since fine adjustment of the distance B is not necessary, the permissible range of the design error can be larger. Therefore, the optical directional coupler can be manufactured easily.

The present invention is not limited to the above-mentioned embodiment but can be modified in various manners according to a desired design.

Figure 6:
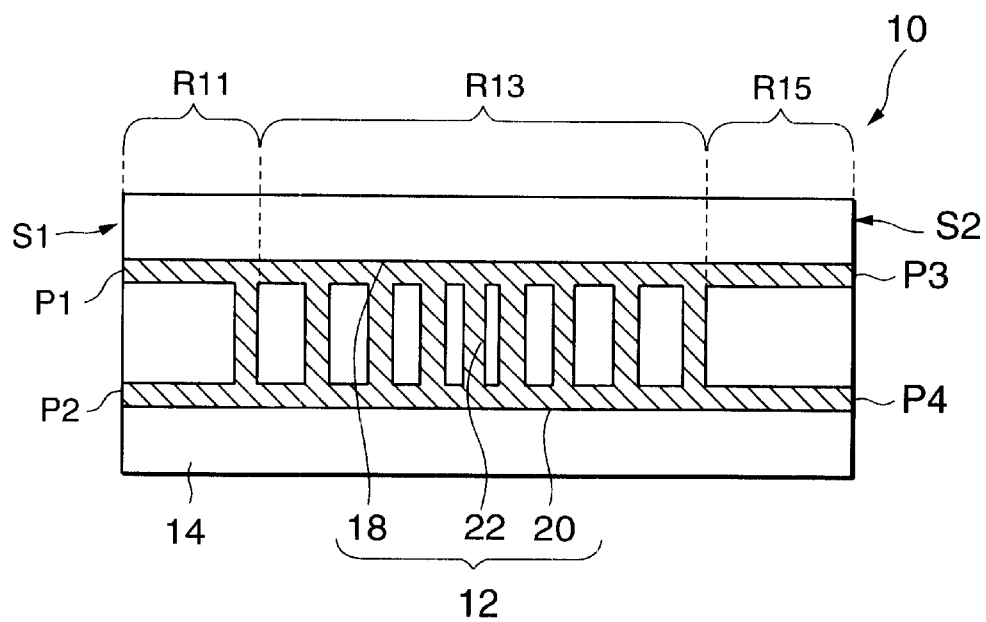
FIG. 6 is a plan view of the embodiment of the present invention.
Figure 7:
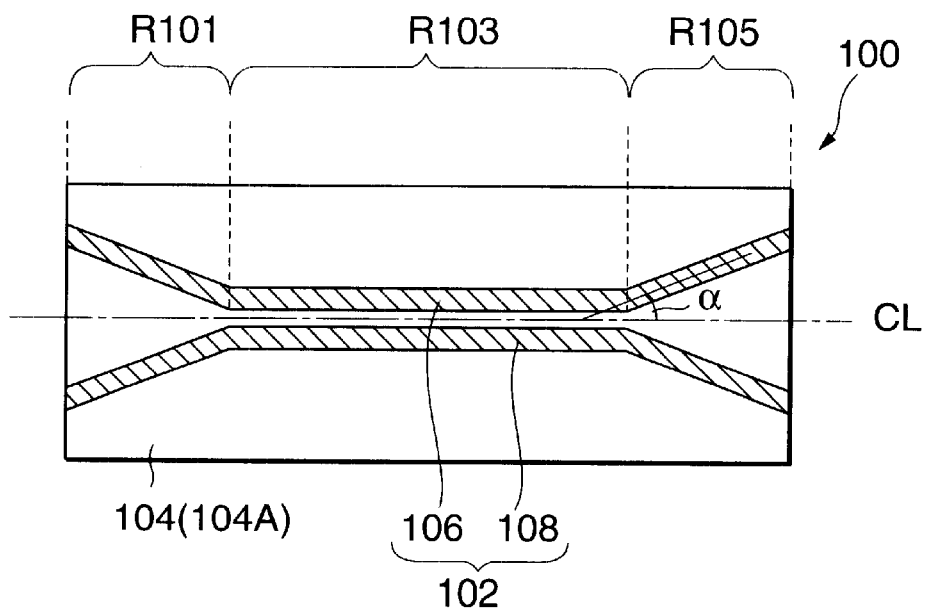
FIG. 7 is a plan view of the first prior-art optical directional coupler.
Figure 8:
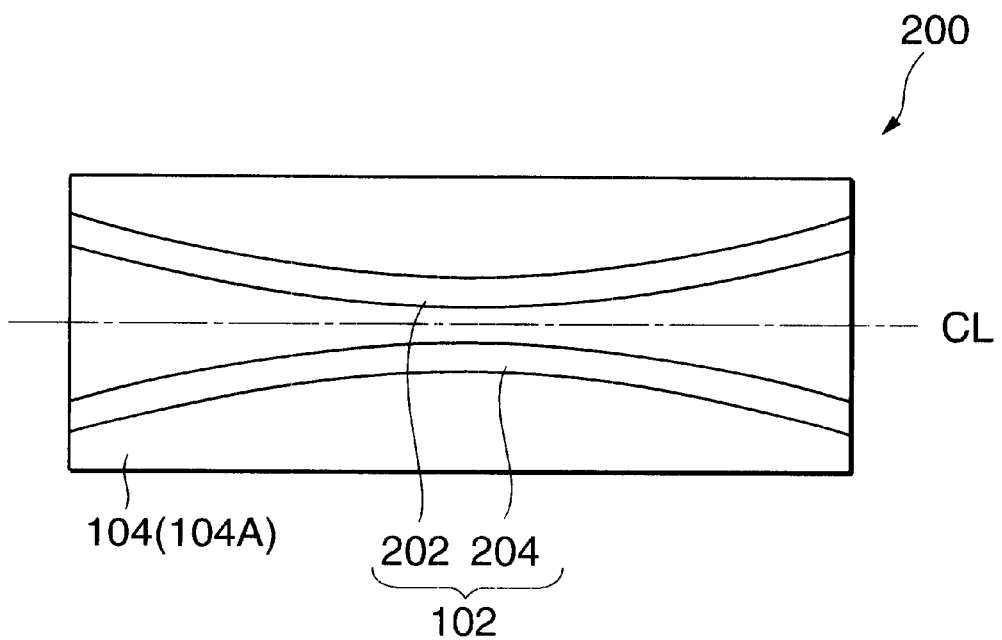
FIG. 8 is a plan view of the second prior-art optical directional coupler.

For example, the distance D between centers of the bridge waveguides 22 may be changed partially as shown in FIG. 6. FIG. 6 is a plan view of the optical directional coupler as viewed from the upper side of the main surface of its clad layer. At the center of the optical signal coupling region R13, the distance D is smaller than the others.

For example, the optical signal may be input from the output port side and then output from the input port side.

For example, moreover, the optical directional coupler can be manufactured by a conventional burying type manufacturing method publicly known in place of the above-mentioned ridge type one.

For example, in addition, any given electrodes may be applied to the clad layer's main surface 14A of the above-mentioned optical coupler 10 and a surface facing this main surface 14A respectively, thus proving an optical switch (i.e., an optical switch of directional coupler type).

As can be seen from the above description, according to the optical directional coupler of the invention, by employing the bridge waveguides, the complete coupling length can be shortened, and therefore the directional coupler can be minimized. In addition, by adjusting the distance between the bridge waveguides, a desired coupling coefficient can be obtained and, as a result, a desired optical-field distribution can be obtained. Furthermore, because fine adjustment of the distance between the first and second waveguides is not necessary, a permissible range of a design error is larger. Therefore, the optical directional coupler can be manufactured easily.

What is claimed is:

1. An optical directional coupler comprising:
   a first waveguide;
   a second waveguide; and
   a plurality of bridge waveguides connecting the first waveguide and the second waveguide, wherein a distance between said bridge waveguides is provided to obtain a desired coupling coefficient between said first waveguide and said second waveguide.

2. An optical directional coupler according to claim 1, wherein the first and second waveguides are straight and parallel each other.

3. An optical directional coupler according to claim 1, wherein the bridge waveguides are straight and parallel each other.

4. An optical directional coupler according to claim 3, wherein each of the bridge waveguides is perpendicular to the first and second waveguides.

5. An optical directional coupler according to claim 3, wherein the bridge waveguides are disposed with equal distance.

6. The optical directional coupler of claim 1, wherein the bridge waveguides are disposed with unequal distance.

7. A method of making an optical directional coupler comprising the steps of:
   providing a first waveguide;
   providing a second waveguide;
   determining a desired coupling coefficient between said first waveguide and said second waveguide; and
   providing a plurality of bridge waveguides connecting said first waveguide and said second waveguide, having a distance between said bridge waveguides to obtain said desired coupling coefficient between said first waveguide and said second waveguide.

* * * * *